(12) United States Patent
Kawamura et al.

(10) Patent No.: US 11,240,389 B2
(45) Date of Patent: Feb. 1, 2022

(54) INFORMATION PROCESSING DEVICE AND NON-TRANSITORY COMPUTER READABLE MEDIUM

(71) Applicant: FUJIFILM Business Innovation Corp., Tokyo (JP)

(72) Inventors: Satoshi Kawamura, Kanagawa (JP); Akira Kadoda, Kanagawa (JP); Koichiro Mino, Kanagawa (JP); Asuka Kurosawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/020,752

(22) Filed: Sep. 14, 2020

(65) Prior Publication Data
US 2021/0306470 A1   Sep. 30, 2021

(30) Foreign Application Priority Data
Mar. 26, 2020  (JP) .............................. JP2020-056594

(51) Int. Cl.
*H04N 1/00*  (2006.01)

(52) U.S. Cl.
CPC ....... *H04N 1/0048* (2013.01); *H04N 1/00307* (2013.01); *H04N 1/00514* (2013.01); *H04N 2201/0094* (2013.01)

(58) Field of Classification Search
CPC ............. H04N 1/0048; H04N 1/00514; H04N 1/00307; H04N 2201/0094
USPC .......................................................... 358/1.13
See application file for complete search history.

(56) References Cited

U.S. PATENT DOCUMENTS

2009/0122342 A1* 5/2009 Kawano ............. H04N 1/00474
                                                                  358/1.15
2017/0094091 A1* 3/2017 Urakawa ................. H04L 51/24

FOREIGN PATENT DOCUMENTS

| JP | 2012-049855 | 3/2012 |
|----|-------------|--------|
| JP | 2016-039566 | 3/2016 |
| JP | 2017123073  | 7/2017 |
| WO | 2017119433  | 7/2017 |

OTHER PUBLICATIONS

Yamamoto Kunitoshi; JP-2018046416-A; Mar. 2018; Fuji-Xerox; English Translation (Year: 2018).*

* cited by examiner

*Primary Examiner* — Neil R McLean
(74) *Attorney, Agent, or Firm* — JCIPRNET

(57) ABSTRACT

An information processing device includes a processor. In a case where a user of a first device cannot use a service provided by a providing device, wherein providing the service requires both of a first setting for the first device and a second setting for the providing device, the processor is configured specify which of the first setting and the second setting is likely not set appropriately based on a usage history of the service, and control to display the specified result.

20 Claims, 14 Drawing Sheets

FIG. 3

| SMARTPHONE ID | USER ID | CONNECTION DATE AND TIME | RESULT |
|---|---|---|---|
| U001 | H001 | 11:23:10 12/20/2019 | FAILURE |
| | | 11:30:10 11/27/2019 | SUCCESS |
| | | ⋮ | ⋮ |
| U002 | H002 | 19:22:50 12/3/2019 | SUCCESS |
| | | ⋮ | ⋮ |
| ⋮ | ⋮ | ⋮ | ⋮ |

FIG. 4

| USAGE DEVICE PROFICIENCY LEVEL / PROVISION DEVICE PROFICIENCY LEVEL | 1ST LEVEL | 2ND LEVEL | 3RD LEVEL |
|---|---|---|---|
| 1ST LEVEL | NOVICE | NOVICE | NOVICE |
| 2ND LEVEL | NOVICE | INTERMEDIATE | INTERMEDIATE |
| 3RD LEVEL | NOVICE | ADVANCED | ADVANCED |

FIG. 5

| DESTINATION IP ADDRESS | | DESTINATION PORT NUMBER | | ... |
|---|---|---|---|---|
| SETTING CONTENT | SETTING DATE AND TIME | SETTING CONTENT | SETTING DATE AND TIME | |
| A2 | 8:13:50 12/10/2019 | N1 | 17:13:40 11/10/2018 | ... |

FIG. 6

| IP ADDRESS | | PORT NUMBER | | ... |
|---|---|---|---|---|
| SETTING CONTENT | SETTING DATE AND TIME | SETTING CONTENT | SETTING DATE AND TIME | |
| A1 | 18:35:20 11/11/2018 | N1 | 7:23:50 12/28/2019 | ... |

FIG. 11

THERE IS A HIGH PROBABILITY THAT YOUR SMARTPHONE IS UNABLE TO USE THE TARGET SERVICE BECAUSE THE FOLLOWING PROVISION SETTING IS INCORRECT IN THE IMAGE FORMING DEVICE.

PORT NUMBER SETTING

FIG. 12

THE SMARTPHONE ASSIGNED THE SMARTPHONE ID = U002 SUCCESSFULLY USED THE TARGET SERVICE ON 19:22:50 12/3/2019, BUT THE PORT NUMBER SET IN THE IMAGE FORMING DEVICE WAS CHANGED ON 7:22:50 12/30/2019.

FIG. 13

THERE IS A HIGH PROBABILITY THAT THE TARGET SERVICE IS UNAVAILABLE BECAUSE THE FOLLOWING USAGE SETTING IS INCORRECT IN YOUR SMARTPHONE.

DESTINATION IP ADDRESS SETTING

FIG. 14

THE TARGET SERVICE WAS SUCCESSFULLY USED ON
19:22:50 12/3/2019
BY THE SMARTPHONE WITH THE SMARTPHONE ID = U002
HAVING A SET DESTINATION IP ADDRESS DIFFERENT FROM
THE DESTINATION IP ADDRESS SET IN YOUR SMARTPHONE.

FIG. 15

THERE IS A HIGH PROBABILITY THAT THE TARGET SERVICE IS UNAVAILABLE BECAUSE THE FOLLOWING USAGE SETTING IS INCORRECT IN YOUR SMARTPHONE.

DESTINATION IP ADDRESS

YOU CAN CHECK THE ABOVE USAGE SETTING BY SPECIFYING ICONS IN THE FOLLOWING ORDER FROM THE MENU SCREEN ON YOUR SMARTPHONE.

MENU SCREEN ⇒ SETTINGS ⇒ NETWORK ⇒ IP ADDRESS

FIG. 16

THERE IS A HIGH PROBABILITY THAT THE TARGET SERVICE IS UNAVAILABLE BECAUSE THE FOLLOWING PROVISION SETTING IS INCORRECT IN THE IMAGE FORMING DEVICE.

PORT NUMBER SETTING

THE ABOVE PROVISION SETTING CAN ONLY BE CHECKED BY THE ADMINISTRATOR OF THE IMAGE FORMING DEVICE.

INFORMATION PROCESSING DEVICE AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-056594 filed Mar. 26, 2020.

BACKGROUND

(i) Technical Field

The present disclosure relates to an information processing device and a non-transitory computer readable medium.

(ii) Related Art

Japanese Unexamined Patent Application Publication No. 2012-049855 discloses an image forming device and an image forming system enabling a user to troubleshoot relatively complex errors. The image forming device is provided with a display controller and a determination unit. The display controller extracts guidance corresponding to an operational error detected by an error detector from among guidance information stored in a guidance storage unit, and displays the extracted guidance on a display. Also, the determination unit determines whether or not to acquire detailed guidance information indicating a more detailed troubleshooting procedure than the guidance information stored in the guidance storage unit, on the basis of an error troubleshooting operation performed by the user after the guidance is displayed on the display and detected by a troubleshooting operation detector. In the case where the determination unit determines to acquire detailed guidance information, a detailed guidance acquisition unit acquires detailed guidance data corresponding to the operational error detected by the error detector from an external device according to the error troubleshooting operation performed by the user, and causes the display to display the acquired detailed guidance.

Japanese Unexamined Patent Application Publication No. 2016-039566 discloses a cause identification system that identifies the cause of an inexpedience occurring in an image forming device more accurately. The cause identification system includes a server that stores types of inexpediences that have occurred in a first image forming device among multiple image forming devices in association with the causes of the inexpediences and the internal state of the first image forming device when the inexpediences occurred. Also, the server executes a search on the basis of an inexpedience warning that indicates the type of an inexpedience occurring in a second image forming device among the multiple image forming devices and the internal state of the second image forming device when the inexpedience occurred. Also, the server creates and transmits, to the second image forming device, a cause notification indicating an extracted cause. When an inexpedience is detected, the second image forming device acquires the internal state when the inexpedience was detected, creates and transmits, to the server, an inexpedience warning indicating at least part of the internal state and the type of the inexpedience, and receives and outputs the cause notification transmitted from the server in response to the inexpedience warning.

Japanese Unexamined Patent Application Publication No. 2017-123073 discloses a customer support assistance system provided with a FAQ presentation unit that presents a FAQ related to a service provided to a customer on a customer terminal operated by the customer, and a viewing history collection unit that collects FAQ viewing history information related to a viewing history of the FAQ by the customer. The customer support assistance system is provided with a storage unit that stores the FAQ viewing history information in association with the customer. Additionally, the customer support assistance system is provided with a viewing history display unit, and when the customer makes a query regarding the service, the viewing history display unit displays the FAQ viewing history information associated with the customer on an operator terminal operated by an operator.

SUMMARY

An issue in the related art is that, in the case where a user is unable to use a usage device to use a service provided by a provision device, the user may have difficulty understanding whether there is a high probability that a relevant setting is not set in either of the provision device and the usage device.

Aspects of non-limiting embodiments of the present disclosure relate to enabling a user to understand whether there is a high probability that a relevant setting is not set in either of the provision device and the usage device in the case where the user is unable to use the usage device to use a service provided by the provision device.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing device including a processor. In a case where a user of a first device cannot use a service provided by a providing device, wherein providing the service requires both of a first setting for the first device and a second setting for the providing device, the processor is configured specify which of the first setting and the second setting is likely not set appropriately based on a usage history of the service, and control to display the specified result.

BRIEF DESCRIPTION OF THE DRAWINGS

An exemplary embodiment of the present disclosure will be described in detail based on the following figures, wherein:

FIG. 3 is a schematic diagram illustrating an example of a configuration of a usage history database according to the exemplary embodiment;

FIG. 4 is a schematic diagram illustrating an example of a configuration of a proficiency level determination database according to the exemplary embodiment;

FIG. 5 is a schematic diagram illustrating an example of a configuration of a usage settings database according to the exemplary embodiment;

FIG. 6 is a schematic diagram illustrating an example of a configuration of a provision settings database according to the exemplary embodiment;

FIG. 11 is a front view illustrating an example of a first specified information text presentation screen according to the exemplary embodiment;

FIG. 12 is a front view illustrating an example of a first reason information presentation screen according to the exemplary embodiment;

FIG. 13 is a front view illustrating an example of a second specified information text presentation screen according to the exemplary embodiment;

FIG. 14 is a front view illustrating an example of a second reason information presentation screen according to the exemplary embodiment;

FIG. 15 is a front view illustrating an example of a third specified information text presentation screen according to the exemplary embodiment;

FIG. 16 is a front view illustrating an example of a fourth specified information text presentation screen according to the exemplary embodiment;

DETAILED DESCRIPTION

Hereinafter, an exemplary embodiment for carrying out the present disclosure will be described in detail and with reference to the drawings.

Figure 1:
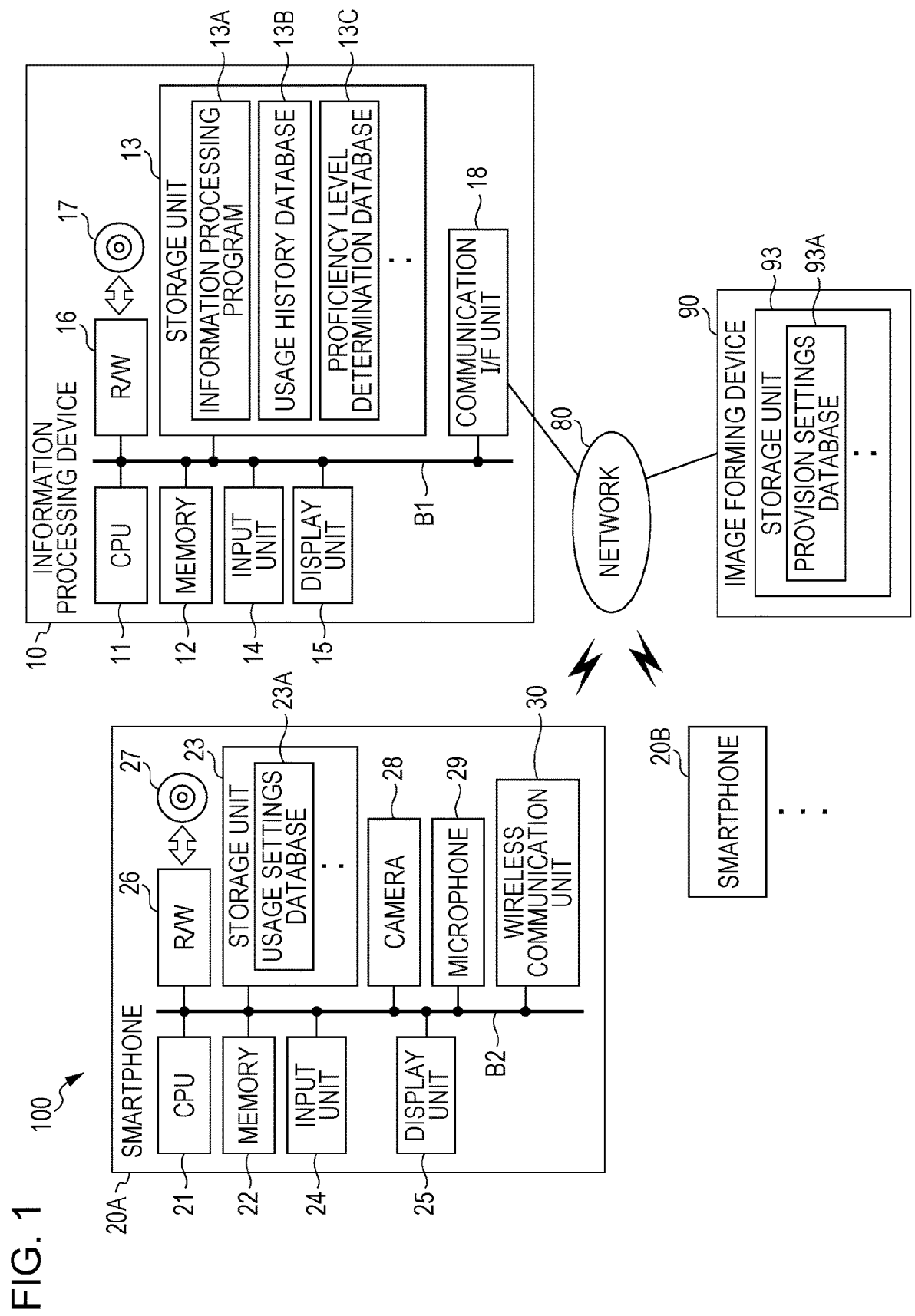
FIG. 1 is a block diagram illustrating an example of a hardware configuration of an information processing system according to an exemplary embodiment.
Figure 2:
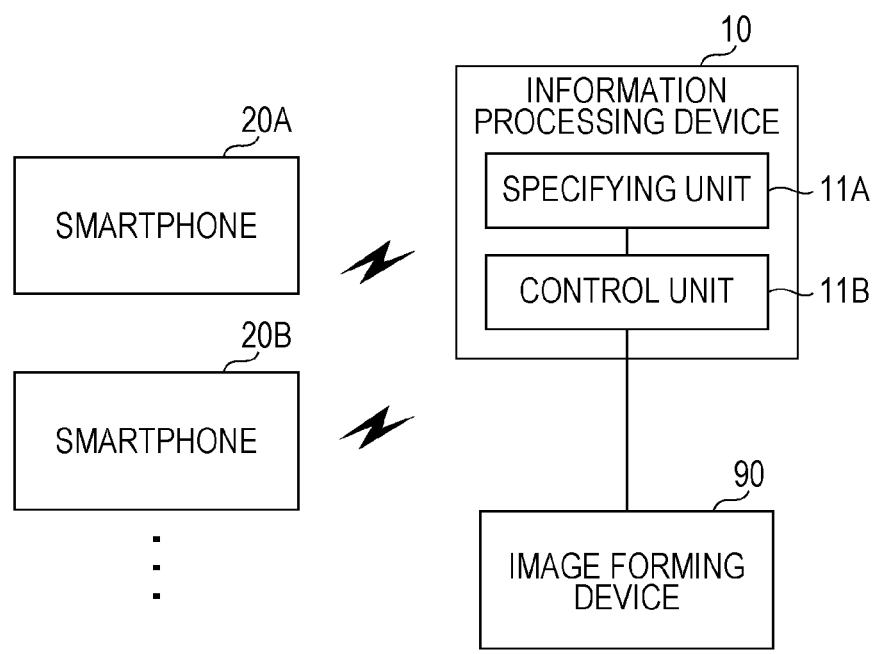
FIG. 2 is a block diagram illustrating an example of a functional configuration of the information processing system according to the exemplary embodiment.

First, FIGS. 1 and 2 will be referenced to describe a configuration of an information processing system 100 according to the exemplary embodiment applying the present disclosure. As illustrated in FIG. 1, the information processing system 100 according to the exemplary embodiment includes an information processing device 10, multiple smartphones 20A, 20B, and so on that act as usage devices, and an image forming device 90 that acts as a provision device, each of which is accessible over a network 80. Note that in the following the smartphones 20A, 20B, and so on will be referred to simply as the "smartphone(s) 20" when not being distinguished individually.

Examples of the information processing device 10 include devices such as a personal computer and a server computer. Also, in the exemplary embodiment, a smartphone is applied as the usage device of the present disclosure, but a configuration that applies a device such as a personal computer, including desktop and laptop computers, or a tablet as the usage device is also possible. Also, in the exemplary embodiment, an image forming device, that is, a digital multi-function device having functions such as an image printing function, an image reading function, and an image transmission function, is applied as the provision device of the present disclosure. However, a configuration that applies a home appliance such as a rice cooker or an air conditioner, a karaoke machine, or the like as the provision device is also possible.

The information processing device 10 according to the exemplary embodiment is provided with a central processing unit (CPU) 11, memory 12 that acts as a temporary storage area, a non-volatile storage unit 13, an input unit 14 such as a keyboard and a mouse, a display unit 15 such as a liquid crystal display, a media reading and writing device (R/W) 16, and a communication interface (I/F) unit 18. The CPU 11, memory 12, storage unit 13, input unit 14, display unit 15, media reading and writing device 16, and communication I/F unit 18 are interconnected through a bus B1. The media reading and writing device 16 reads out information written to a recording medium 17 and also writes information to the recording medium 17.

The storage unit 13 is realized by a hard disk drive (HDD), a solid-state drive (SSD), flash memory, or the like. An information processing program 13A is stored in the storage unit 13 that acts as a storage medium. The information processing program 13A is stored in the storage unit 13 by setting the recording medium 17 with the information processing program 13A written thereon in the media reading and writing device 16 and causing the media reading and writing device 16 to read out the information processing program 13A from the recording medium 17. The CPU 11 reads out the information processing program 13A from the storage unit 13 and loads the information processing program 13A into the memory 12, and sequentially executes processes included in the information processing program 13A.

The storage unit 13 also stores a usage history database 13B and a proficiency level determination database 13C. The usage history database 13B and the proficiency level determination database 13C will be described in detail later.

On the other hand, the smartphone 20 according to the exemplary embodiment is a device carried by each user who uses a service provided by the image forming device 90 using the information processing system 100 (hereinafter simply referred to as a "user"). The smartphone 20 is provided with a CPU 21, memory 22 that acts as a temporary storage area, a non-volatile storage unit 23, an input unit 24 such as a touch panel, a display unit 25 such as a liquid crystal display, and a media reading and writing device 26. Additionally, the smartphone 20 is provided with a camera, a microphone, and a wireless communication unit 30. The CPU 21, memory 22, storage unit 23, input unit 24, display unit 25, media reading and writing device 26, camera, microphone, and wireless communication unit 30 are interconnected through a bus B2. The media reading and writing device 26 reads out information written to a recording medium 27 and also writes information to the recording medium 27.

The storage unit 23 is realized by an HDD, an SSD, flash memory, or the like, and stores a usage settings database 23A. The usage settings database 23A will be described in detail later. Also, in the smartphone 20 according to the exemplary embodiment, usage settings which are relevant to the use of the service provided by the image forming device 90 are set by the user.

On the other hand, the image forming device 90 according to the exemplary embodiment is provided with a non-volatile storage unit 93. The storage unit 93 is realized by an HDD, an SSD, flash memory, or the like, and stores a provision settings database 93A. The provision settings database 93A will be described in detail later. Also, in the image forming device 90 according to the exemplary embodiment, provision settings which are relevant to the provision of the service are set by an administrator of the image forming device 90 (hereinafter simply referred to as the "administrator").

Note that the image forming device 90 according to the exemplary embodiment is also provided with components such as an image forming unit, a paper feeding unit that supplies paper for recording, and a communication I/F unit that communicates with external devices as a principal configuration, but a description of such components is omitted here to avoid confusion.

Next, FIG. 2 will be referenced to describe a functional configuration of the information processing device 10 according to the exemplary embodiment. As illustrated in FIG. 2, the information processing device 10 includes a specifying unit 11A and a control unit 11B. The CPU 11 of the information processing device 10 functions as the specifying unit 11A and the control unit 11B by executing the information processing program 13A.

In the case where the service provided by the image forming device 90 (hereinafter referred to as the "target service") is unavailable using a first smartphone 20, the specifying unit 11A according to the exemplary embodiment uses a usage history of the target service to specify a setting (hereinafter referred to as the "specified setting") that has a high probability of not being set appropriately among the provision settings and usage settings. Particularly, in the exemplary embodiment, a usage history of use of the image forming device 90 by each smartphone 20 is applied as the usage history. However, a usage history of use of the image forming device 90 by only the first smartphone 20 may also be applied as the usage history. In addition, the control unit 11B according to the exemplary embodiment controls the presentation of specified information indicating the specified result.

Also, in the case where the usage history indicates that a second smartphone 20 other than the first smartphone 20 has been used to use the target service, the specifying unit 11A specifies a usage setting of the first smartphone 20 (hereinafter referred to as a "first usage setting") as the specified setting.

Also, in the case where identification information for identifying the image forming device 90 in the usage settings is different between the second smartphone 20 and the first smartphone 20 that have used the target service, the specifying unit 11A according to the exemplary embodiment specifies the identification information in the first usage setting as the specified setting. Note that in the exemplary embodiment, information about a destination Internet Protocol (IP) address and information about a destination port number are applied as the identification information, but information such as a media access control (MAC) address or a name of the image forming device 90 may also be applied as the identification information, and configurations in which the above pieces of information are applied individually or in combinations of multiple pieces of information are also possible.

Also, in the case where a provision setting has changed during the period from the point in time at which the target service was last used using the second smartphone 20 until the point in time at which the target service became unavailable using the first smartphone 20, the specifying unit 11A according to the exemplary embodiment specifies the changed provision setting as the specified setting.

Also, in the case where the first usage setting has changed during the period from the point in time at which the target service was last used using the first smartphone 20 until the point in time at which the target service became unavailable using the first smartphone 20, the specifying unit 11A according to the exemplary embodiment specifies the changed first usage setting as the specified setting.

In addition, the control unit 11B according to the exemplary embodiment controls the additional presentation of reason information indicating a reason why the specifying unit 11A specified the specified setting. Particularly, in the exemplary embodiment, information determined according to a combination of proficiency levels of the user is applied as the reason information, the proficiency levels being a proficiency level with respect to the image forming device 90 classified in three levels and a proficiency level with respect to the first smartphone 20 classified in three levels. However, the configuration is not limited thereto. For example, information determined according to a proficiency level of knowledge related to information and communication technology (ICT) of the user may also be applied as the reason information. Alternatively, information determined according to the above pieces of information individually or in combinations of multiple pieces of information may also be applied as the reason information.

In addition, the control unit 11B according to the exemplary embodiment controls the presentation of the specified information according to at least one of a presentation method and presented content that depend on at least one of the proficiency levels of the user, the proficiency levels being the proficiency level with respect to the image forming device 90 and the proficiency level with respect to the first smartphone 20. Particularly, in the exemplary embodiment, a proficiency level classified in three levels and determined according to a combination of usage histories of the user is applied as the proficiency level, the usage histories being a usage history of using the image forming device 90 and a usage history of using the first smartphone 20. However, the configuration is not limited thereto. For example, a proficiency level of knowledge related to ICT of the user may also be applied as the proficiency level. Alternatively, a proficiency level determined according to the above proficiency levels individually or in combinations of multiple proficiency levels may also be applied as the proficiency level. Also, a proficiency level divided into more than three levels or a proficiency level divided into two levels may also be applied as the proficiency level.

Also, in the case where a provision setting is specified as the specified setting by the specifying unit 11A, the control unit 11B according to the exemplary embodiment controls the additional presentation of instruction information indicating an instruction for correcting the provision setting. Particularly, in the exemplary embodiment, the control unit 11B controls the presentation of the instruction information to the administrator in the case where a provision setting is specified multiple times as the specified setting by the specifying unit 11A in a predetermined period. However, the configuration is not limited thereto. For example, a configuration may be applied in which the control unit 11B controls the presentation of the instruction information to the administrator every time a provision setting is specified as the specified setting by the specifying unit 11A. Also, the control unit 11B according to the exemplary embodiment controls the presentation of instruction information according to at least one of a presentation method and presented content that depend on whether or not the user is an administrator.

Note that in the exemplary embodiment, the presentation of a screen by the display unit 25 is applied as the presentation. However, the configuration is not limited thereto. For example, the presentation of sound by a sound output function of the smartphone 20 may also be applied as the presentation.

Next, the usage history database 13B according to the exemplary embodiment will be described. As illustrated in FIG. 3, in the usage history database 13B according to the exemplary embodiment, a smartphone ID, a user ID, a connection date and time, and a result are stored in association with each other.

The smartphone ID is information for individually identifying the smartphone 20 that uses the target service, and is an ID preassigned as different information for each smartphone 20. Also, the user ID is information for identifying the user who uses the smartphone 20 indicated by the corresponding smartphone ID, and is an ID preassigned as different information for each user. Also, the connection date and time is information indicating the date and time when the smartphone 20 indicated by the corresponding smartphone ID accessed the network 80 to use the target service. The result is information indicating whether or not the target service was used successfully by the smartphone 20 indicated by the corresponding smartphone ID at the corresponding connection date and time. Note that in the example illustrated in FIG. 3, "Success" indicates that the target service was used successfully while "Failure" indicates that the target service was not used successfully.

Also, in the exemplary embodiment, an image printing service is applied as the target service, but the configuration is not limited thereto, and another service such as an image reading service or an image transmission service for example may also be applied. In addition, the "service" referred to herein includes processes that are performed free of charge as well as paid processes. For instance, the example illustrated in FIG. 3 illustrates that the user assigned H001 as the user ID was unable to use the smartphone 20 assigned U001 as the smartphone ID to use the target service at 11:23:10 on Dec. 20, 2019.

Next, the proficiency level determination database 13C according to the exemplary embodiment will be described. As illustrated in FIG. 4, in the proficiency level determination database 13C according to the exemplary embodiment, a usage device proficiency level and a provision device proficiency level are stored in association with each other.

The usage device proficiency level is information indicating a proficiency level of the user with respect to the first smartphone 20, and is classified in three levels from a 1st level to a 3rd level. Also, the provision device proficiency level is information indicating a proficiency level of the user with respect to the image forming device 90, and is classified in three levels from a 1st level to a 3rd level. For instance, in the example illustrated in FIG. 6, in the case where at least one of the usage device proficiency level and the provision device proficiency level is the 1st level, the proficiency level is treated as a novice level. In the case where the provision device proficiency level is the 2nd level and the usage device proficiency level is not the 1st level, the proficiency level is treated as an intermediate level, and in the case where the provision device proficiency level is the 3rd level and the usage device proficiency is not the 1st level, the proficiency level is treated as an advanced level. However, the method of classifying the proficiency level is not limited to the above.

Note that in the exemplary embodiment, the usage device proficiency level may also be classified according to the number of pieces of application software that the user has used by using the first smartphone 20 within a predetermined period T1 (for example, one year) going back from the connection date and time. In this case, the usage device proficiency level is treated as the 3rd level in at least one of the case where the number of pieces of used application software is a predetermined number C1 (for example, 10) or greater and the case where the user is an administrator of the image forming device 90. Also, the usage device proficiency level is treated as the 2nd level in the case where the number of pieces of application software is less than C1 and also equal to or greater than C2 (for example, 5). Also, the usage device proficiency level is treated as the 1st level in the case where the number of pieces of application software is less than C2.

However, the method of classifying the usage device proficiency level is not limited to the above. For example, the usage device proficiency level may also be classified according to whether or not the user has used a predetermined piece of application software by using the first smartphone 20 within the predetermined period T1. Additionally, the usage device proficiency level may also be classified according to the number of usage settings that the user has changed within the predetermined period T1. Alternatively, the usage device proficiency level may be classified according to the above classification methods individually or in combinations of multiple classification methods. Note that in the exemplary embodiment, the usage device proficiency level is assumed to be stored in a predetermined area of the storage unit 23 to avoid confusion.

Also, in the exemplary embodiment, the provision device proficiency level may be classified according to the number of pieces of application software that the user has used by using the image forming device 90 within a predetermined period T2 (for example, one year) going back from the connection date and time. In this case, the provision device proficiency level is treated as the 3rd level in the case where the number of pieces of used application software is a predetermined number C3 (for example, 10) or greater. The provision device proficiency level is treated as the 2nd level in the case where the number of pieces of application software is less than C3 and also equal to or greater than C4 (for example, 5). The provision device proficiency level is treated as the 1st level in the case where the number of pieces of application software is less than C4.

However, the method of classifying the provision device proficiency level is not limited to the above. For example, the provision device proficiency level may also be classified according to whether or not the user has used a predetermined piece of application software (function) by using the image forming device 90 within the predetermined period T2. Additionally, the provision device proficiency level may also be classified according to the number of provision settings that the user has caused an administrator to change within the predetermined period T2. Alternatively, the provision device proficiency level may be classified according to the above classification methods individually or in combinations of multiple classification methods. Note that in the exemplary embodiment, the provision device proficiency level is assumed to be stored in a predetermined area of the storage unit 93 to avoid confusion.

Note that in the exemplary embodiment, periods set in advance by an administrator or the like are applied as the predetermined period T1 and the predetermined period T2. However, a configuration that automatically sets the predetermined period T1 and the predetermined period T2 according to factors such as the usage frequency of the first smartphone 20 and the image forming device 90 is also possible. Additionally, in the exemplary embodiment, numbers set in advance by an administrator or the like are applied as the predetermined number C1, the predetermined number C2, the predetermined number C3, and the predetermined number C4. However, a configuration that automatically sets the predetermined number C1, the predetermined number C2, the predetermined number C3, and the predetermined number C4 according to factors such as the usage frequency of the first smartphone 20 and the image forming device 90 is also possible.

Next, the usage settings database 23A according to the exemplary embodiment will be described. As illustrated in FIG. 5, in the usage settings database 23A according to the exemplary embodiment, setting content and a setting date and time for each setting target such as a destination IP address and a destination port number are stored in association with each other.

The setting content is information that indicates the setting content for each setting target of the usage settings, and the setting date and time is the most recent date and time when the corresponding setting content was set. Note that in the exemplary embodiment, a destination IP address setting and a destination port number setting are applied as the usage settings. However, the configuration is not limited thereto. For example, a connect/disconnect setting for Wi-Fi (registered trademark) communication and a user identification (ID) and password setting for identifying the user may also be applied as the usage settings. Alternatively, the above settings may be applied individually or in combinations of multiple settings as the usage settings. For instance, the example illustrated in FIG. 5 illustrates that the setting "A2" as the destination IP address setting was set at 8:13:50 on Dec. 10, 2019.

Next, the provision settings database 93A according to the exemplary embodiment will be described. As illustrated in FIG. 6, in the provision settings database 93A according to the exemplary embodiment, setting content and a setting date and time for each setting target such as an IP address and a port number are stored in association with each other.

The setting content is information that indicates the setting content for each setting target of the provision settings, and the setting date and time is information similar to that in the usage settings database 23A. Note that in the exemplary embodiment, an IP address setting and a port number setting are applied as the provision settings. However, the configuration is not limited thereto. For example, a setting for setting whether or not each target service is usable using the smartphone 20 and a usable smartphone ID or the like may also be applied as the provision settings. Alternatively, the above settings may be applied individually or in combinations of multiple settings as the provision settings. For instance, the example illustrated in FIG. 6 illustrates that the setting "A1" as the IP address setting was set at 18:35:20 on Nov. 11, 2018.

Figure 7A:
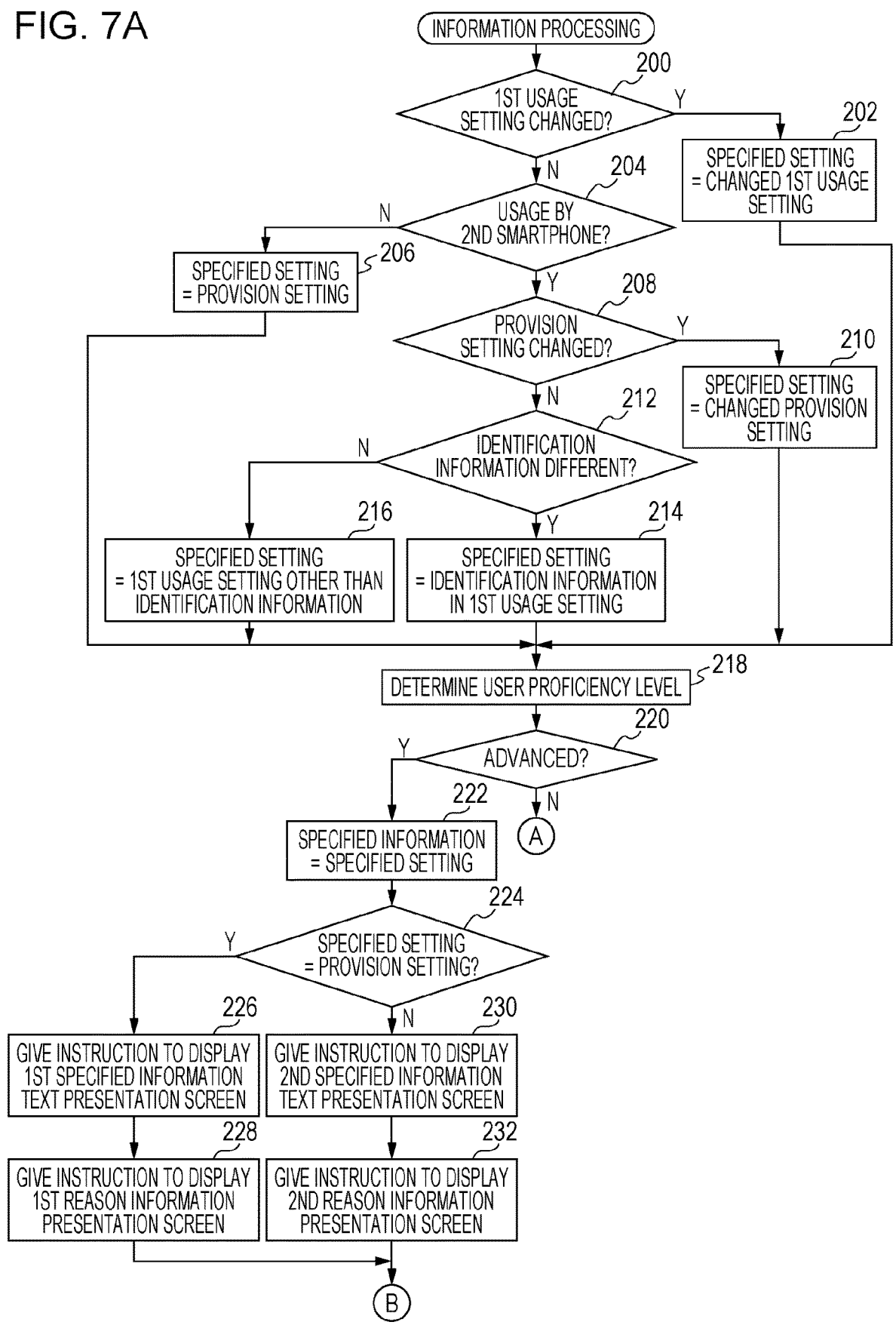
FIGS. 7A and 7B are flowcharts illustrating an example of the flow of information processing according to the exemplary embodiment.
Figure 7B:
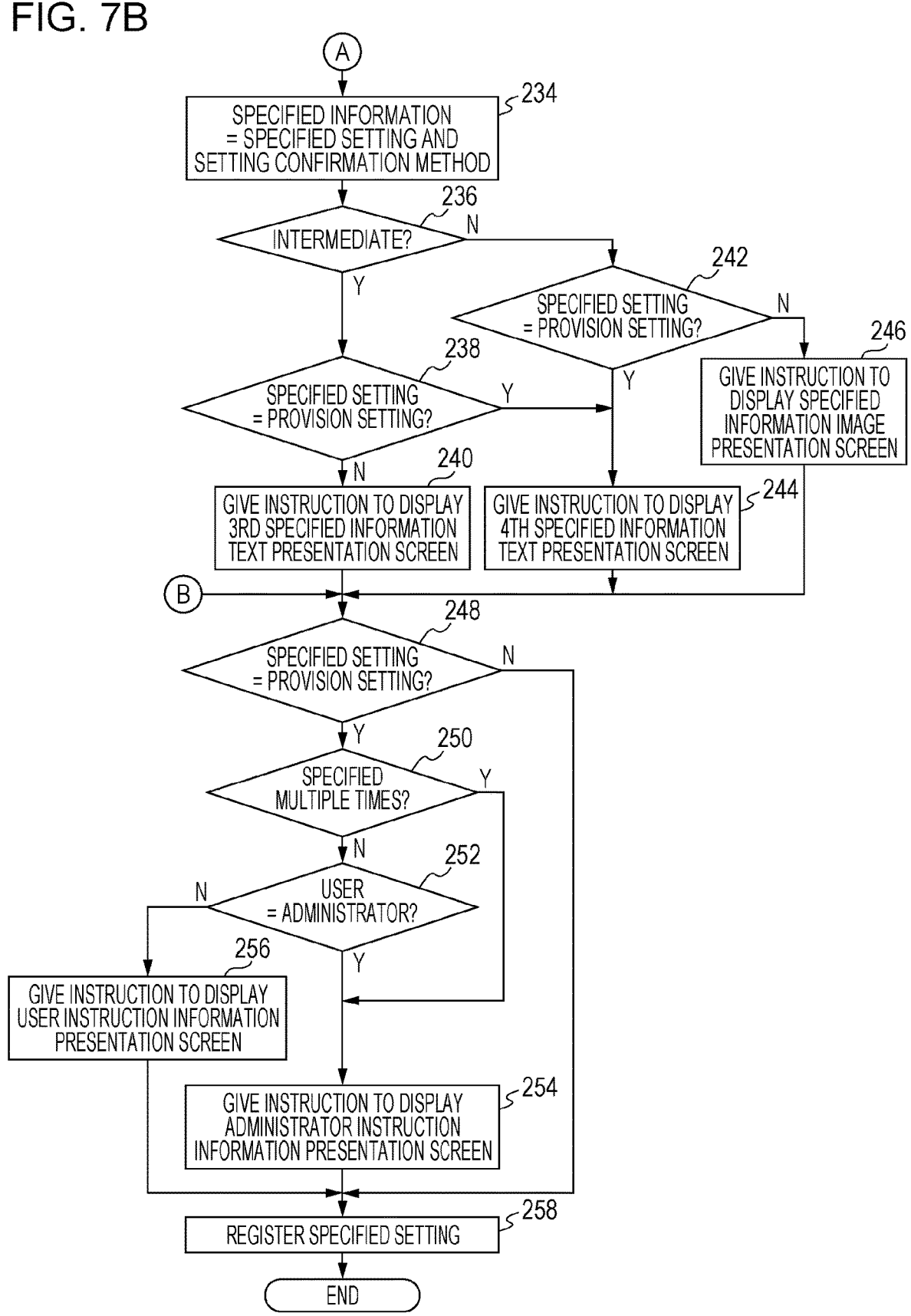

Next, FIGS. 7A and 7B will be referenced to describe the actions of the information processing device 10 when executing information processing. In the case where the user is unable to use the target service using the first smartphone 20, execution instruction information indicating an instruction to execute information processing is transmitted from the first smartphone 20 to the information processing device 10, and by having the CPU 11 of the information processing device 10 execute the information processing program 13A in response, the information processing illustrated in FIGS. 7A and 7B is executed. Note that the exemplary embodiment describes a case where an indication of whether or not the user is an administrator of the image forming device 90 is stored in a predetermined area of the storage unit 23. Also, the exemplary embodiment describes an example where the administrator of the image forming device 90 is also an administrator of the information processing device 10.

In step 200, the CPU 11 determines whether or not the first usage settings have changed. Specifically, the CPU 11 reads out the usage history database 13B from the storage unit 13 and also receives the usage settings database 23A from the first smartphone 20 from which the execution instruction information originated. The CPU 11 compares the usage history obtained by receiving to the setting content and the setting date and time in the first usage setting. The CPU 11 determines whether or not the first usage setting has changed during the period from the point in time at which the target service was last used using the first smartphone 20 until the point in time at which the target service became unavailable using the first smartphone 20. In the case of a positive determination, the CPU 11 proceeds to step 202. In the case of a negative determination, the CPU 11 proceeds to step 204.

Figure 8:
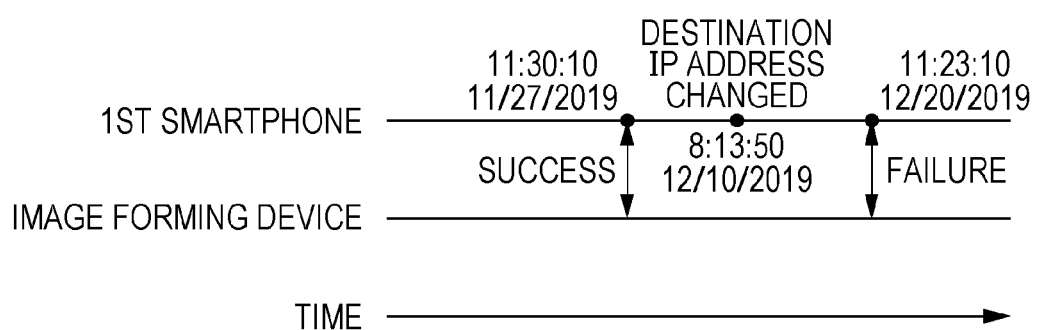
FIG. 8 is a schematic diagram accompanying an explanation of a method of specifying a specified setting in a case where a first usage setting is changed according to the exemplary embodiment.

In step 202, the CPU 11 specifies the changed first usage setting as the specified setting. For instance, as illustrated in FIG. 8 as an example, consider the case where the date and time at which the target service was last used by the first smartphone 20 is 11:30:10 on Nov. 27, 2019, and the date and time at which the target service became unavailable to the first smartphone 20, or in other words the date and time at that point in time is 11:23:10 on Dec. 20, 2019. In this case, the destination IP address setting in the first usage setting was changed at 8:13:50 on Dec. 10, 2019, which is between the above dates and times. Consequently, the destination IP address setting that was changed at 8:13:50 on Dec. 10, 2019 is specified as the specified setting.

In step 204, the CPU 11 references the usage history and determines whether or not the target service was used using the second smartphone 20 within the predetermined period T3 (for example, 40 days) going back from the connection date and time. In other words, the CPU 11 determines whether or not the target services has been used using a smartphone other than the first smartphone 20 within the predetermined period T3 going back from the date and time of accessing the network 80 to use the target service. Note that in the exemplary embodiment, a period set in advance by an administrator or the like is applied as the predetermined period T3. However, a configuration that automatically sets a determined length of time as the predetermined period T3 according to factors such as the usage frequency of the image forming device 90 is also possible. The CPU 11 proceeds to step 206 in the case of a negative determination and to step 208 in the case of a positive determination.

In step 206, the CPU 11 specifies the provision settings as the specified setting, and proceeds to step 218.

In step 208, the CPU 11 determines whether or not the provision settings have changed. Specifically, the CPU 11 receives the provision settings database 93A from the image forming device 90, and compares the usage history to the setting content and setting date and time in the provision settings. Thereafter, the CPU 11 determines whether or not the provision settings have changed during the period from the point in time at which the target service was last used using the second smartphone 20 until the point in time at which the target service became unavailable using the first smartphone 20. In the case of a positive determination, the CPU 11 proceeds to step 210.

Figure 9:
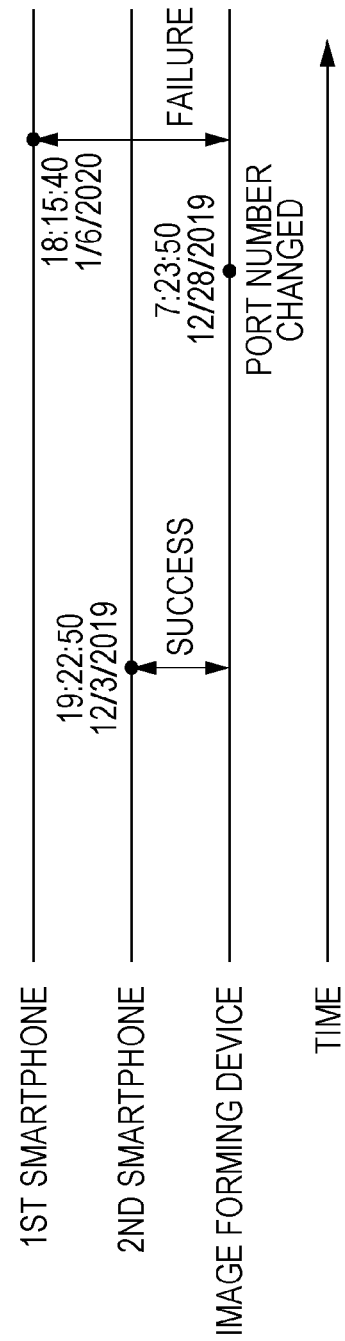
FIG. 9 is a schematic diagram accompanying an explanation of a method of specifying a specified setting in a case where a provision setting is changed according to the exemplary embodiment.

In step 210, the CPU 11 specifies the changed setting in the provision settings as the specified setting. For instance, as illustrated in FIG. 9 as an example, consider the case where the date and time at which the target service was last used by the second smartphone 20 is 19:22:50 on Dec. 3, 2019, and the date and time at which the target service became unavailable to the first smartphone 20, or in other words the date and time at that point in time is 18:15:40 on Jan. 6, 2020. In this case, the port number setting in the provision settings was changed at 7:23:50 on Dec. 28, 2019, which is between the above dates and times. In this case, the process in step 208 is a positive determination, and by the process in step 210, the port number setting in the provision settings is specified as the specified setting.

Figure 10:
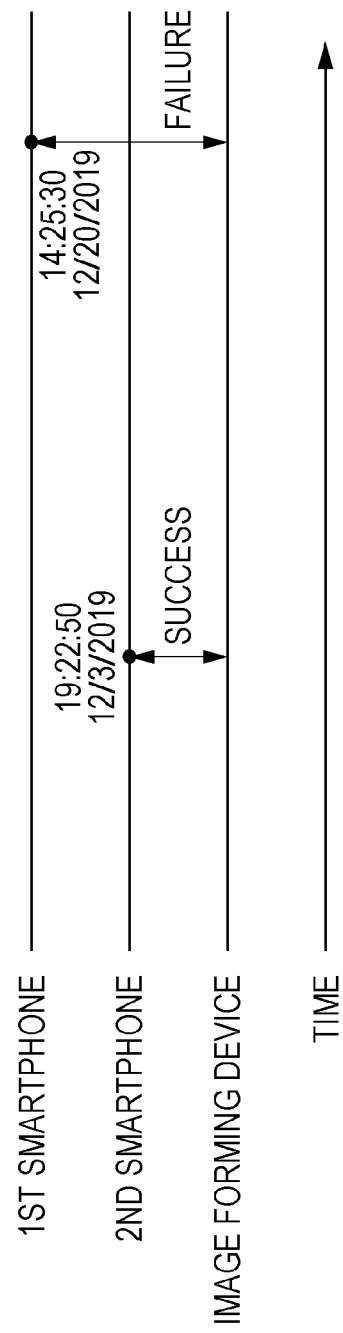
FIG. 10 is a schematic diagram accompanying an explanation of a method of specifying a specified setting in a case where a first usage setting and a provision setting are changed according to the exemplary embodiment.

On the other hand, as illustrated in FIG. 10 as an example, consider the case where the date and time at which the target service was last used by the second smartphone 20 is 19:22:50 on Dec. 3, 2019, and the date and time at which the target service became unavailable to the first smartphone 20, or in other words the date and time at that point in time is 14:25:30 on Dec. 20, 2019. In this case, the provision settings and the first usage setting have not changed between the above dates and times. In this case, the process in step 208 is a negative determination.

Returning to step 208 in FIG. 7A, in the case of a negative determination, the CPU 11 proceeds to step 212.

In step 212, the CPU 11 determines whether or not the identification information in a usage setting of the second smartphone 20 that has used the target service (hereinafter referred to as a "second usage setting") and the identification information in the first usage setting are different. Specifically, the CPU 11 receives the usage settings database 23A from the second smartphone 20 that has used the target service. The CPU 11 compares the setting content and setting date and time in the first usage setting to the setting content and setting date and time in the second usage setting. Additionally, the CPU 11 determines whether or not the identification information for identifying the image forming device 90 is different between the second smartphone 20 that has used the target service and the first smartphone 20. The CPU 11 proceeds to step 214 in the case of a positive determination and to step 216 in the case of a negative determination.

In step 214, the CPU 11 specifies the identification information setting in the first usage setting as the specified setting, and proceeds to step 218.

In step 216, the CPU 11 specifies a first usage setting other than the identification information as the specified setting, and proceeds to step 218.

In step 218, the CPU 11 receives the usage device proficiency level from the first smartphone 20, and also receives the provision device proficiency level from the image forming device 90. Additionally, the CPU 11 reads out the proficiency level determination database 13C from the storage unit 13. The CPU 11 references the received proficiency levels and the proficiency level determination database 13C to determine the proficiency level of the user (hereinafter referred to as the "user proficiency level"), and proceeds to step 220.

In step 220, the CPU 11 determines whether or not the user proficiency level determined by the process in step 218 is the advanced level. In the case of a positive determination, the CPU 11 proceeds to step 222.

In step 222, the CPU 11 treats specified information to be displayed on the display unit 25 as information indicating the specified setting.

Next, in step 224, the CPU 11 determines whether or not a provision setting has been specified as the specified setting by the process from step 200 to step 216. In the case of a positive determination, the CPU 11 proceeds to step 226.

In step 226, the CPU 11 causes the display unit 25 to display a first specified information text presentation screen that presents the specified information as text information.

Next, in step 228, the CPU 11 causes the display unit 25 to display a first reason information presentation screen that presents reason information, and proceeds to step 248.

As illustrated in FIG. 11, on the first specified information text presentation screen according to the exemplary embodiment, the specified setting (in the example illustrated in FIG. 11, "Port number setting") and a message indicating that the first smartphone 20 is unable to use the target service because the specified setting is incorrect are displayed. Consequently, by referring to the first specified information text presentation screen, the user is able to understand the specified setting.

As illustrated in FIG. 12, on the first reason information presentation screen according to the exemplary embodiment, reason information (in the example illustrated in FIG. 12, information indicating the reason why the port number setting has been specified as the specified setting) is displayed. Note that in the exemplary embodiment, the reason information is displayed as text information. However, the reason information may also be displayed as image information, such as a symbol or a sign. Consequently, by referring to the first reason information presentation screen, the user is able to understand the reason information.

Returning to step 224 in FIG. 7A, in the case of a negative determination, the CPU 11 proceeds to step 230.

In step 230, the CPU 11 causes the display unit 25 to display a second specified information text presentation screen that presents the specified information as text.

Next, in step 232, the CPU 11 causes the display unit 25 to display a second reason information presentation screen that presents reason information, and proceeds to step 248.

As illustrated in FIG. 13, on the second specified information text presentation screen according to the exemplary embodiment, the specified setting (in the example illustrated in FIG. 13, "Destination IP address setting") and a message indicating that the first smartphone 20 is unable to use the target service because the specified setting is incorrect are displayed. Consequently, by referring to the second specified information text presentation screen, the user is able to understand the specified setting.

As illustrated in FIG. 14, on the second reason information presentation screen according to the exemplary embodiment, reason information (in the example illustrated in FIG. 14, information indicating the reason why the destination IP address setting has been specified as the specified setting) is displayed. Note that in the exemplary embodiment, the reason information is displayed as text information. However, the reason information may also be displayed as image information, such as a symbol or a sign. Consequently, by referring to the second reason information presentation screen, the user is able to understand the reason information.

Returning to step 220 in FIG. 7A, in the case of a negative determination, the CPU 11 proceeds to step 234.

In step 234, the CPU 11 treats the specified information as information indicating the specified setting and a method of confirming the specified setting.

Next, in step 236, the CPU 11 determines whether or not the user proficiency level determined by the process in step 218 is the intermediate level. In the case of a positive determination, the CPU 11 proceeds to step 238.

In step 238, the CPU 11 determines whether or not a provision setting has been specified as the specified setting by the process from step 200 to step 216. In the case of a positive determination, the CPU 11 proceeds to step 244 described later. In the case of a negative determination, the CPU 11 proceeds to step 240.

In step 240, the CPU 11 causes the display unit 25 to display a third specified information text presentation screen that presents the specified information as text information, and proceeds to step 248.

As illustrated in FIG. 15, on the third specified information text presentation screen according to the exemplary embodiment, the specified setting (in the example illustrated in FIG. 15, "Destination IP address setting"), a message indicating that the first smartphone 20 is unable to use the target service because the specified setting is incorrect, and a method of confirming the specified setting (in the example illustrated in FIG. 15, a method of operating the first smartphone 20 to confirm the destination IP address setting) are displayed. Consequently, by referring to the third specified information text presentation screen, the user is able to understand the specified setting and the method of confirming the specified setting.

Returning to step 236 in FIG. 7B, in the case of a negative determination, the CPU 11 proceeds to step 242.

In step 242, the CPU 11 determines whether or not a provision setting has been specified as the specified setting by the process from step 200 to step 216. In the case of a positive determination, the CPU 11 proceeds to step 244.

In step 244, the CPU 11 causes the display unit 25 to display a fourth specified information text presentation screen that presents the specified information as text information, and proceeds to step 248.

As illustrated in FIG. 16, on the fourth specified information text presentation screen according to the exemplary embodiment, the specified setting (in the example illustrated in FIG. 16, "Port number setting"), a message indicating that the first smartphone 20 is unable to use the target service because the specified setting is incorrect, and a message indicating that the specified setting can only be confirmed by an administrator are displayed. Consequently, by referring to the fourth specified information text presentation screen, the user is able to understand the specified setting and also understand that the specified setting can only be confirmed by an administrator.

Returning to step 242 in FIG. 7B, in the case of a negative determination, the CPU 11 proceeds to step 246.

In step 246, the CPU 11 causes the display unit 25 to display a specified information image presentation screen that presents the method of confirming the specified setting among the specified information as image information, and proceeds to step 248.

Figure 17:
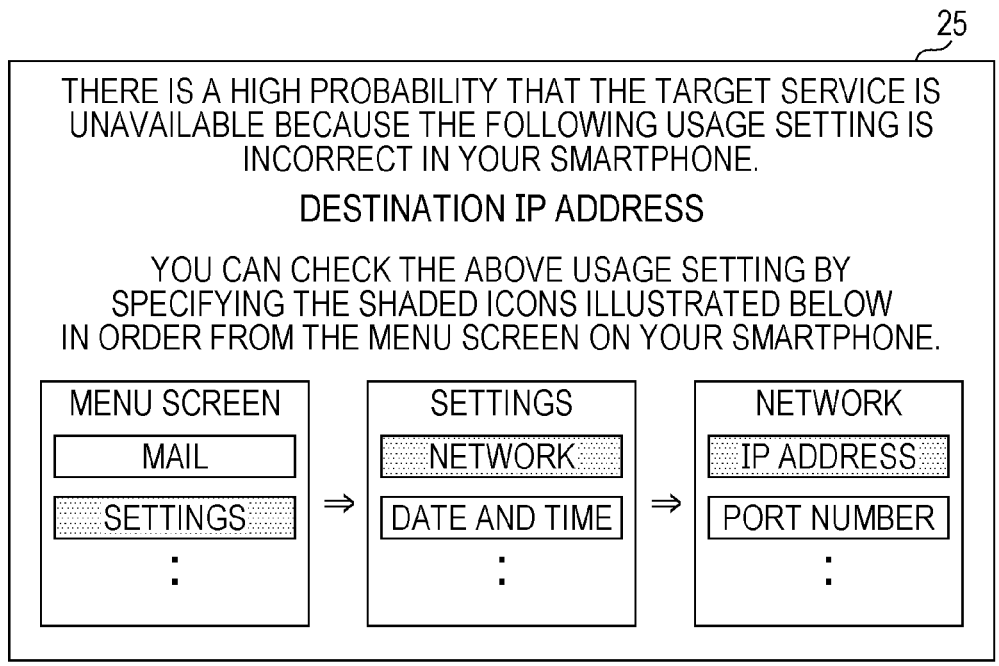
FIG. 17 is a front view illustrating an example of a specified information image presentation screen according to the exemplary embodiment.

As illustrated in FIG. 17, on the specified information image presentation screen according to the exemplary embodiment, the specified setting (in the example illustrated in FIG. 17, "Destination IP address setting") and a message indicating that the first smartphone 20 is unable to use the target service because the specified setting is incorrect are displayed as text information. In addition, on the specified information image presentation screen according to the exemplary embodiment, the method of confirming the specified setting (in the example illustrated in FIG. 17, a method of operating the first smartphone 20 to confirm the destination IP address setting) are displayed. However, the method of confirming the specified setting may also be displayed as a moving image. Consequently, by referring to the specified information image presentation screen, the user is able to understand the specified setting and the method of confirming the specified setting.

Next, in step 248 of FIG. 7B, the CPU 11 determines whether or not a provision setting has been specified as the specified setting by the process from step 200 to step 216. The CPU 11 proceeds to step 258 described later in the case of a negative determination and to step 250 in the case of a positive determination.

In step 250, the CPU 11 references a predetermined area of the storage unit 13 and determines whether or not a provision setting has been specified as the specified setting a predetermined number of times K1 (for example, two times) within a predetermined period T4 (for example, one hour) going back from the connection date and time. The CPU 11 proceeds to step 254 described later in the case of a positive determination and to step 252 in the case of a negative determination. Note that in the exemplary embodiment, a period set in advance by an administrator or the like is applied as the predetermined period T4. However, a configuration that automatically sets the predetermined period T4 according to factors such as the usage frequency of the first smartphone 20 and the image forming device 90 is also possible. Also, in the exemplary embodiment, a number of times equal to or greater than two times set in advance by an administrator or the like is applied as the predetermined number of times K1. However, a configuration that automatically sets a number of times equal to or greater than two times as the predetermined number of times K1 according to factors such as the usage frequency of the first smartphone 20 and the image forming device 90 is also possible.

In step 252, the CPU 11 receives information related to whether or not the user is an administrator of the image forming device 90 from the first smartphone 20, and determines whether or not the user is an administrator of the image forming device 90. In the case of a positive determination, the CPU 11 proceeds to step 254.

In step 254, the CPU 11 causes the display unit 15 to display an administrator instruction information presentation screen that presents administrator instruction information instructing the administrator to correct the provision setting specified as the specified setting, and proceeds to step 258.

Figure 18:
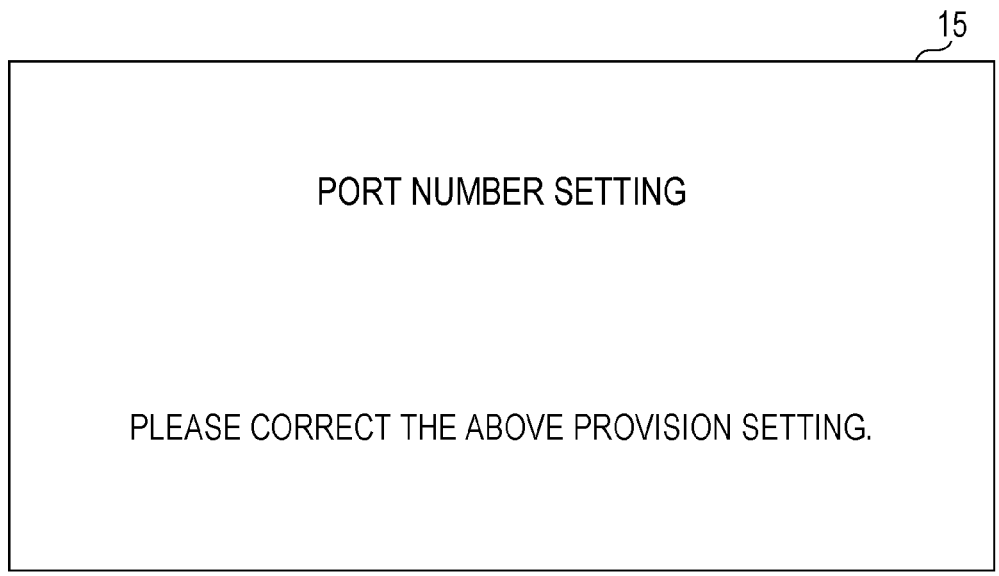
FIG. 18 is a front view illustrating an example of an administrator instruction information presentation screen according to the exemplary embodiment.

As illustrated in FIG. 18, on the administrator instruction information presentation screen according to the exemplary embodiment, the provision setting set as the specified setting (in the example illustrated in FIG. 18, "Port number setting") and administrator instruction information are displayed. Note that in the exemplary embodiment, the provision setting set as the specified setting and the administrator instruction information are displayed as text information. However, the provision setting and the administrator instruction information may also be displayed as image information, such as a symbol or a sign. Consequently, by referring to the administrator instruction information presentation screen, the administrator is able to understand the provision setting set as the specified setting and the administrator instruction information.

Returning to step 252 in FIG. 7B, in the case of a negative determination, the CPU 11 proceeds to step 256.

In step 256, the CPU 11 causes the display unit 25 to display a user instruction information presentation screen that presents user instruction information instructing the user to request an administrator to correct the provision setting set as the specified setting.

Figure 19:
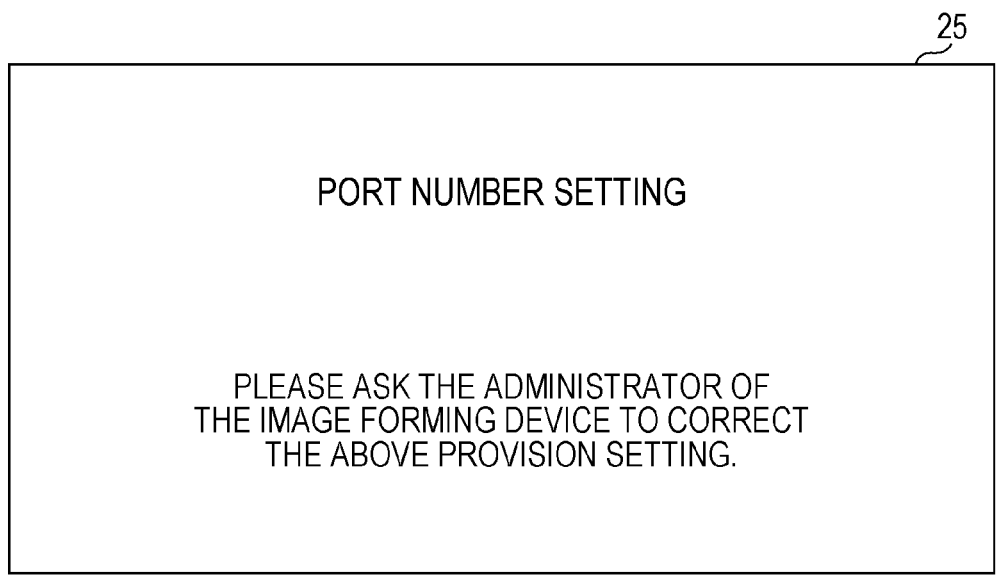
FIG. 19 is a front view illustrating an example of a user instruction information presentation screen according to the exemplary embodiment.

As illustrated in FIG. 19, on the user instruction information presentation screen according to the exemplary embodiment, the provision setting set as the specified setting (in the example illustrated in FIG. 19, "Port number setting") and user instruction information are displayed. Note that in the exemplary embodiment, the provision setting set as the specified setting and the user instruction information are displayed as text information. However, the provision setting and the user instruction information may also be displayed as image information, such as a symbol or a sign. Consequently, by referring to the user instruction information presentation screen, the user is able to understand the provision setting set as the specified setting and the user instruction information.

Next, in step 258, the CPU 11 registers the specified setting in a predetermined area of the storage unit 13, and then ends the information processing.

The foregoing describes an exemplary embodiment, but the technical scope of the present disclosure is not limited to the scope described in the foregoing exemplary embodiment. Various modifications or alterations may be made to the foregoing exemplary embodiment within a scope that does not depart from the gist of the present disclosure, and any embodiments obtained by such modifications or alterations are also included in the technical scope of the present disclosure.

Furthermore, the foregoing exemplary embodiment does not limit the present disclosure as stated in the claims, and not all combinations of features described in the exemplary embodiment are necessarily required as means for addressing the issues of the present disclosure. The exemplary embodiment described above includes various levels of disclosure, and the various disclosures are elicited through the combination of the multiple structural elements disclosed herein. Even if several structural elements are removed from among all of the structural elements illustrated in the exemplary embodiment, the configuration with the several structural elements removed therefrom may still be elicited as a disclosure insofar as an effect is obtained.

In the exemplary embodiment, the term "processor" refers to hardware in a broad sense. Examples of the processor include general processors (e.g., CPU: Central Processing Unit), and dedicated processors (e.g., GPU: Graphics Processing Unit, ASIC: Application Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

Additionally, the exemplary embodiment describes a case where the information processing program 13A is preinstalled in the storage unit 13, but the configuration is not limited thereto. For example, the information processing program 13A may also be provided stored on a storage medium such as Compact Disc-Read-Only Memory (CD-ROM), or may be provided over a network.

Furthermore, the foregoing exemplary embodiment describes a case in which the information processing is achieved by a software configuration using a computer by executing a program, but the present disclosure is not limited thereto. For example, the information processing may also be achieved by a hardware configuration, or by a combination of a hardware configuration and a software configuration.

Otherwise, the configuration of the information processing device 10 (see FIGS. 1 and 2) described in the foregoing exemplary embodiment is a single example, and obviously, unnecessary portions may be removed or new portions may be added within a scope that does not depart from the gist of the present disclosure.

Also, the flow of the information processing (see FIGS. 7A and 7B) described in the foregoing exemplary embodiment is a single example, and obviously, unnecessary steps may be removed, new steps may be added, or the processing sequence may be rearranged within a scope that does not depart from the gist of the present disclosure.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing device comprising:
a processor configured to
in a case where a user of a first device cannot use a service provided by a providing device, wherein providing the service requires both of a first setting for the first device and a second setting for the providing device,
specify which of the first setting and the second setting is likely not set appropriately based on a usage history of the service; and
control to display the specified result.

2. The information processing device according to claim 1, wherein
the usage history is a history of using the service with the first device.

3. The information processing device according to claim 2, wherein
the usage history is a history of using the service with the first device and with a second device other than the first device.

4. The information processing device according to claim 3, wherein the processor is further configured to:
in a case where the usage history indicates that the service has been used with the second device, specify that the first setting is likely not set appropriately.

5. The information processing device according to claim 4, wherein the processor is further configured to:
in a case where identification information, set in the first device and the second device, for identifying a provider of the service is different from each other, specify that the first information is likely not set appropriately.

6. The information processing device according to claim 4, wherein the processor is further configured to:
in a case where the second setting has been changed during a period from a time point when the service was last used with the second device to a time point when the service became unavailable with the first device, specify that the second setting is likely not set appropriately.

7. The information processing device according to claim 5, wherein
in a case where the second setting has been changed during a period from a time point when the service was last used with the second device to a time point when the service became unavailable with the first device, specify that the second setting is likely not set appropriately.

8. The information processing device according to claim 1, wherein the processor is further configured to:
in a case where the first setting of the first device has changed during a period from a time point when the service was last used with the first device to a time point when the service became unavailable using the first device, specify that the changed setting is likely not set appropriately.

9. The information processing device according to claim 2, wherein
in a case where the first setting of the first device has changed during a period from a time point when the service was last used with the first device to a time point when the service became unavailable using the first device, specify that the changed setting is likely not set appropriately.

10. The information processing device according to claim 3, wherein
in a case where the first setting of the first device has changed during a period from a time point when the service was last used with the first device to a time point when the service became unavailable using the first device, specify that the changed setting is likely not set appropriately.

11. The information processing device according to claim 4, wherein
in a case where the first setting of the first device has changed during a period from a time point when the service was last used with the first device to a time point when the service became unavailable using the first device, specify that the changed setting is likely not set appropriately.

12. The information processing device according to claim 5, wherein
in a case where the first setting of the first device has changed during a period from a time point when the service was last used with the first device to a time point when the service became unavailable using the first device, specify that the changed setting is likely not set appropriately.

13. The information processing device according to claim 1, wherein the processor is further configured to:
control to display a reason why the specified setting is likely not set appropriately.

14. The information processing device according to claim 13, wherein
the reason is determined according to a proficiency level of a user of the service, the proficiency level being at least one of a proficiency with respect to the providing device and a proficiency with respect to the first device.

15. The information processing device according to claim 1, wherein
the processor is configured to control to display differently the specified information depending on a proficiency level of a user who uses the service, the proficiency level including at least one of a proficiency level with respect to the providing device and a proficiency level with respect to the first device.

16. The information processing device according to claim 14, wherein
the proficiency level is determined according to at least one usage history of the user, the at least one usage history including a history of using the providing device and a history of using the first device.

17. The information processing device according to claim 1, wherein the processor is further configured to:
in a case where the second setting is specified as likely not to be set appropriately, control to display instruction information indicating an instruction for correcting the first setting.

18. The information processing device according to claim 17, wherein the processor is further configured to:
in a case where the second setting is specified as likely not to have been set appropriately a plurality of times in a predetermined period, control to present instruction information to an administrator of the providing device.

19. The information processing device according to claim 17, wherein the processor is further configured to:
control to differentiate how to display the instruction information depending on whether or not a user who uses the service is an administrator of the providing device.

20. A non-transitory computer readable medium storing a program causing a computer to execute a process for processing information, the process comprising:
in a case where a user of a first device cannot use a service provided by a providing device, wherein providing the service requires both of a first setting for the first device and a second setting for the providing device, specifying which of the first setting and the second setting is likely not set appropriately based on a usage history of the service; and
control to display the specified result.

* * * * *